(12) United States Patent
Cunningham et al.

(10) Patent No.: US 12,010,367 B2
(45) Date of Patent: Jun. 11, 2024

(54) BROADCAST IN-HOME STREAMING

(71) Applicant: Synamedia Limited, Staines Upon Thames (GB)

(72) Inventors: James Leigh Cunningham, Hampshire (GB); Stephen Paul Isaac, Hampshire (GB); Richard Andrew Morrell, Berkshire (GB)

(73) Assignee: Synamedia Limited, Staines Upon Thames (GB)

( * ) Notice: Subject to any disclaimer, the term of this patent is extended or adjusted under 35 U.S.C. 154(b) by 72 days.

(21) Appl. No.: 17/038,157

(22) Filed: Sep. 30, 2020

(65) Prior Publication Data

US 2022/0103883 A1 Mar. 31, 2022

(51) Int. Cl.
*H04N 21/262* (2011.01)
*H04N 21/2389* (2011.01)
*H04N 21/434* (2011.01)
*H04N 21/845* (2011.01)

(52) U.S. Cl.
CPC . *H04N 21/26258* (2013.01); *H04N 21/23895* (2013.01); *H04N 21/4344* (2013.01); *H04N 21/8456* (2013.01)

(58) Field of Classification Search
CPC ....... H04N 21/26258; H04N 21/23895; H04N 21/4344; H04N 21/8456
See application file for complete search history.

(56) References Cited

U.S. PATENT DOCUMENTS

| 7,031,348 B1 * | 4/2006 | Gazit ............... | H04N 21/23608 |
| | | | 375/365 |
| 2007/0136780 A1 * | 6/2007 | Park ................ | H04H 20/95 |
| | | | 725/50 |
| 2009/0087162 A1 * | 4/2009 | Qiu ................... | H04N 5/765 |
| | | | 386/347 |
| 2009/0257508 A1 | 10/2009 | Aggarwal et al. | |
| 2009/0282475 A1 * | 11/2009 | George ............... | G06F 16/44 |
| | | | 726/21 |

(Continued)

FOREIGN PATENT DOCUMENTS

WO 2012003237 A1 1/2012

OTHER PUBLICATIONS

Extended European Search Report dated Mar. 14, 2022, European Patent Application No. 21200347.9, pp. 1-7.

*Primary Examiner* — Joshua D Taylor
(74) *Attorney, Agent, or Firm* — Fernando & Partners, LLP

(57) ABSTRACT

Techniques for broadcast in-home streaming are described. In some embodiments, the method is performed at a gateway device. The gateway device demultiplexes a broadcast stream to a plurality of streams, including a first stream and a second stream and anchors a first presentation time range of a first segment based on a random access point in the first stream and a first frame in the second stream. The gateway device also identifies one or more frames in the first stream based on presentation timestamps and decoding timestamps of a last frame in the first presentation time range and a first frame in a second presentation time range. The gateway device further captures frames from the second stream within the first presentation time range and generates the first segment having the first presentation time range, including the random access point, the one or more frames, the first frame, and the frames.

20 Claims, 11 Drawing Sheets

(56) References Cited

U.S. PATENT DOCUMENTS

| | | | |
|---|---|---|---|
| 2011/0138018 A1* | 6/2011 | Raveendran | H04L 65/1069 |
| | | | 709/219 |
| 2014/0153909 A1* | 6/2014 | MacInnis | H04N 21/242 |
| | | | 386/353 |
| 2015/0288736 A1* | 10/2015 | Caulfield | H04L 65/80 |
| | | | 709/219 |
| 2017/0289639 A1* | 10/2017 | Reisner | H04N 21/4882 |
| 2019/0069004 A1* | 2/2019 | Badawiyeh | H04N 21/2383 |

* cited by examiner

| Sample Encoding | Container Formats | Usage | Playlist Support | Encryption Support |
|---|---|---|---|---|
| MP2 Video | MP2TS | SD | HLS | Segment-Encryption |
| MP1 Audio | MP2TS/MP3 | SD/HD | HLS | Segment-Encryption |
| AC3 Audio | MP2TS/MP3/FMP4 | HD | HLS/DASH | Segment-Encryption/CENC-CTR |
| AVC Video | MP2TS/FMP4 | HD | HLS/DASH | Segment-Encryption/CENC-CTR |
| HEVC Video | FMP4 | UHD | HLS/DASH | CENC-CBCS/CENC-CTR |

Figure 2

BROADCAST IN-HOME STREAMING

TECHNICAL FIELD

The present disclosure relates generally to streaming of broadcast content over a local area network.

BACKGROUND

Broadcast operators face various obstacles to the delivery of certain content by the provision of over-the-top (OTT) services delivered via broadband. For example, some services that are available on broadcast (e.g. satellite broadcast) may not be available OTT and/or cannot be served via OTT without incurring extra cost. At the same time, video-on-demand (VOD) content providers offer full access to their OTT services via built-in applications on multiple in-home devices. As such, facing increasing competition from the VOD content providers, previously existing streaming methods, devices, and systems are inadequate to the task of expanding broadcast services to in-home devices.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIG. 2 is a table illustrating exemplary playlist support and encryption schemes for various media formats, in accordance with some embodiments;

Figure 1:
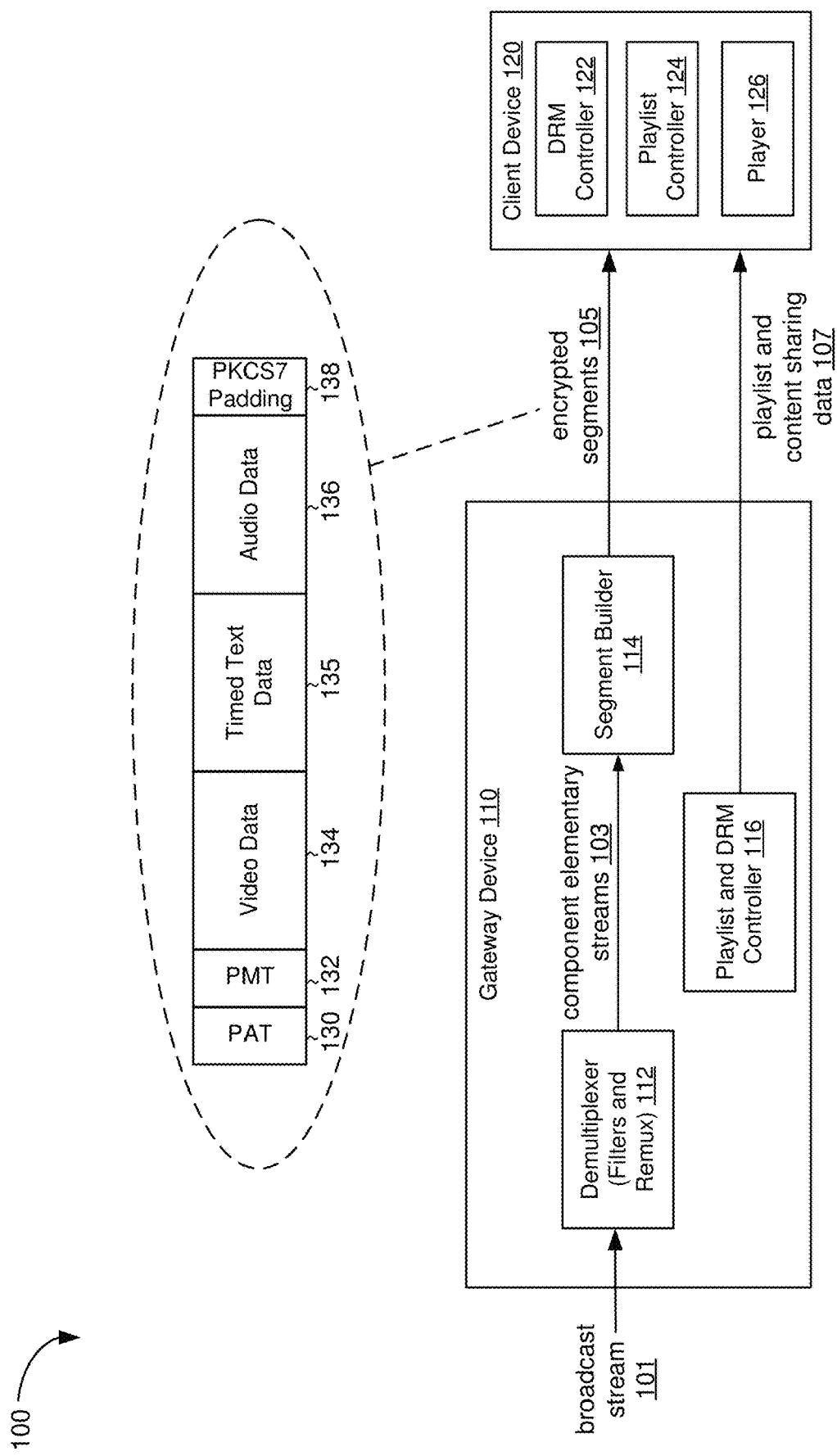
FIG. 1 is a block diagram of an exemplary in-home streaming system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

A streaming method allows broadcast in-home streaming from a gateway device (e.g., a satellite receiver and/or a set-top-box (STB)) to low cost client devices. The in-home streaming system leverages the streaming and security capabilities of the client devices to overcome the aforementioned rights and/or cost obstacles associated with over-the-top (OTT). The streaming method utilizes the gateway device to convert broadcast content according to adaptive streaming standards (e.g., HTTP live streaming (HLS)). The gateway device then streams the converted content to the client devices over a local area network within the home (e.g., an in-home network). Accordingly, the broadcast in-home streaming methods, devices, and systems described herein enable a secure, low cost, and reliable solution that provides high-quality in-home streaming experience for broadcast content.

In accordance with various embodiments, a broadcast in-home streaming method is performed at a device (e.g., a satellite gateway device, a satellite receiver, a set-top-box, etc.) with a processor and a non-transitory memory. The method includes demultiplexing a broadcast stream to a plurality of streams, which includes a first stream and a second stream. The method further includes anchoring a first presentation time range of a first segment based on a random access point in the first stream and a first frame in the second stream. The method also includes identifying one or more frames in the first stream based on presentation timestamps and decoding timestamps of a last frame in the first presentation time range and a first frame in a second presentation time range. The method additionally includes capturing frames from the second stream within the first presentation time range. The method further includes generating the first segment having the first presentation time range, including the random access point, the one or more frames, the first frame, and the frames.

Example Embodiments

Traditional satellite receivers are restricted to viewing on a single display. As described above, broadcast operators, including satellite broadcast operators, are expanding their offerings by the additional provision of over-the-top (OTT) services delivered via broadband. However, such deployment faces various obstacles. First, rights restrictions prevent some broadcast content from being offered via OTT, e.g., content not permitted to be streamed via OTT, OTT PVR functionality being excluded by cloud digital video recorder (DVR) common copy restrictions, and/or content not supported by certain device types. Second, transmitting content via OTT may increase the cost. For example, satellite broadcast typically has a cost structure that is independent of the number of consumers. In contrast, there is a transmission cost of serving each piece of content via OTT. Third, a subset of households may not have sufficiently fast broadband connection(s) to reliably stream content in the highest quality.

A streaming method described herein in accordance with various embodiments addresses the aforementioned issues by in-home streaming from a gateway device (e.g., a satellite gateway device, a satellite receiver, and/or a set-top-box (STB)) to low cost client devices. The streaming method leverages the streaming and security capabilities of the client devices without incurring additional costs associated with the OTT transmission. The gateway device converts broadcast content (e.g., digital broadcast content, including but not limited to satellite and/or cable, etc.) into prevailing adaptive streaming standards (e.g., HLS) for consumption on the client devices, which are based around the adaptive streaming standards. The content is converted in a way that offers a low-latency and high-quality user experience without compromising security.

FIG. 1 is a block diagram illustrating an exemplary in-home streaming system 100 in accordance with some embodiments. In some embodiments, a gateway device 110 (e.g., a set-top-box (STB) and/or a satellite receiver) receives a broadcast stream 101 (e.g., a satellite broadcast stream). The gateway device 110 converts the broadcast stream 101 to encrypted segments 105 according to an adaptive streaming standard in accordance with some embodiments. The gateway device 110 then delivers the encrypted segments 105 to a client device 120 for in-home streaming.

Broadcasters typically broadcast satellite content in a transport stream container format. On the receiving end, different generations of STBs use a variety of audio and video streaming formats. For example, standard definition (SD) services tend to use MPEG 2 for video and MPEG 1 for audio. In another example, high definition (HD) services tend to use advanced video coding (AVC) for video and AC3 format for audio. In some embodiments, HD services may also have MPEG 1 audio tracks for narrative tracks for the visually impaired. In yet another example, ultra high definition (UHD) services tend to use high efficiency video coding (HEVC) for video and AC3 format for audio. An exemplary table 200 in FIG. 2 illustrates the playlist support for different media formats. As shown in FIG. 2, the common playlist format that supports SD, HD, and UHD sample encodings is HTTP live streaming (HLS). Accordingly, in some embodiments, for SD, HD, or UHD content, the in-home streaming system 100 uses HLS as the adaptive streaming standard. In such embodiments, for SD or HD content, the in-home streaming system 100 uses MP2 transport stream (TS) as the container format in accordance with some embodiments. Further in such embodiments, for UHD content, the in-home streaming system 100 uses fragmented MP4 (FMP4) as the container format. In some embodiments, the encryption schemes for various streaming formats include, but not limited to, segment encryption, ISO common encryption (CENC) AES counter mode (CTR), and/or CENC CBCS mode. It should be noted that the content definitions are not limited to the examples shown in FIG. 2. The in-home broadcast method in accordance with various embodiments can support other definitions as well, e.g., 8K content.

Still referring to FIG. 1, in some embodiments, to create compliant and standard HLS segments, the gateway device 110 includes a demultiplexer 112 to demultiplex the broadcast stream 101 into a plurality of component elementary streams 103, e.g., an audio elementary stream (ES), a video TS, and/or an ES for carrying timed text (referred to hereinafter as the "timed text ES", "text ES", or "text stream"). Examples of the timed text ES include, but not limited to, an ES for carrying timed text, teletext, closed captions, and/or subtitles that match the accompanying video and/or audio content. In some embodiments, to demultiplex the broadcast stream 101, the demultiplexer 112 utilizes a tuner, a plurality of packet identifier (PID) and elementary stream filters, and/or a re-multiplexer to capture various types of packets. For example, the demultiplexer 112 includes a PID and ES filter to demultiplex the audio portion, e.g., by buffering an audio packetized elementary stream (PES) in an audio buffer, and includes another PID and ES filter to demultiplex the timed text portion, e.g., by buffering a PES in a timed text buffer. In some embodiments, the demultiplexer 112 utilizes the re-multiplexer to capture video packets (e.g., AVC or MP2 packets, etc.).

In some embodiments, the gateway device 110 further includes a segment builder 114 for generating encrypted segments 105, which are then streamed to the client device 120 for in-home consumption. In some embodiments, the segment builder 114 packages frames from the component elementary streams 103 into the encrypted segments 105. In some embodiments, the gateway device 110 also includes a playlist and digital rights management (DRM) controller 116. The playlist and DRM controller 116, as will be described in further detail below with reference to FIG. 3, manages the video segment index to support playlist generation and segment requests for in-home streaming. The gateway device 110 then sends playlists and content sharing data 107 (e.g., information associated with licenses, keys, and/or entitlements, etc.) to the client device 120 to facilitate the in-home streaming of the encrypted segments 105.

In some embodiments, as will be described in further detail below, segmentation at the start of live streaming ensures that the first segment starts from a random access point (RAP), e.g. MP2 I-frame. To achieve this, in some embodiments, the demultiplexer 112 re-multiplexes the MP2 TS to provide a single program transport stream (SPTS) comprised of the video stream. At the same time, the demultiplexer 112 demultiplexes audio and timed text into the component elementary streams 103, before the segment builder 114 re-packetizes the component elementary streams 103 into MP2 TS and appends the MP2 TS to the re-multiplexed video stream as shown in FIG. 1. As such, the elementary data related to the segment can be multiplexed together into a single container, e.g., a TS container.

In some other embodiments, the elementary data related to a segment are packaged into separate containers, where the different containers share the same time base. A subset of satellite services transmits multiple audio tracks (e.g., different audio languages using different codecs), but does not broadcast each language in each audio format. Most HLS players provide interoperability when each audio group includes the same set of renditions for each encoding. As such, in some embodiments, the segment builder 114 packages the video delivered in a TS (e.g., in one container), but package each of the multiple audios/timed text as separate containers (e.g., in one or more different containers). Packaging in multiple containers allows the client device 120 to request the data that they want to receive, e.g. requesting and receiving the video segment and the English audio segment even though other audio segments such as French and/or German are available for the same time period.

In some embodiments, the client device 120 receives the playlists and the content sharing data 107 as well as the encrypted segments 105 from the gateway device 110. In some embodiments, the client device 120 includes an authenticator (not shown) to authenticate and/or authorize a user, e.g., whether the user has subscribed to a service, a DRM controller 122, a playlist controller 124, and a player 126 for rendering decrypted media content. In some embodiments, the digital rights management (DRM) controller 122 manages licenses (e.g., keys for decrypting the encrypted segments 105) and facilitates requesting and retrieving the licenses. As will be described in further detail below with reference to FIG. 3, the playlist controller 124 in some embodiments executes an application that enables a broadcaster to stream satellite content within a home and maintain control over both the gateway device 110 and the client device 120. The end-to-end control minimizes unnecessary duplication of network traffic.

The demultiplexer 112 prepares the video and audio content for the consumption on the client device 120, which is based around adaptive streaming standards, e.g., HLS. Routinely, a satellite broadcaster broadcasts video, audio, and/or timed text packets ahead of their scheduled decoding and/or presentation time. The amount by which such video/audio packets are ahead varies. The variation results in a fluctuating temporal buffer of video/audio packets. The fluctuating temporal buffer allows the broadcaster to handle a sudden change (e.g., a sudden run of scene changes) without a noticeable drop in quality. However, for adaptive streaming standards, the client device 120 expects a matching range of presentable audio and video content for each of the encrypted segments 105.

Some solutions attempt to slice the video streams. However, simply cutting the video transport stream based on the audio duration may split a subset of RAPs across segments, which may negatively affect the trick mode user experience. For the same reason, simply cutting the video transport stream based on the program clock reference (PCR) may also negatively affect the trick mode user experience, because a subset of RAPs is split across segments. In a similar vein, cutting the video transport stream based on the video duration is problematic because of the aforementioned variability of when video frames are transmitted relative to when they are presented.

Specifically, if the video segments are made available when a specified amount of new video content is received (e.g., a group of pictures (GOP), a second of presentable content, etc.), then, depending on any intervening changes in how far in advance the content is transmitted ahead of presentation, new segments may be listed in the playlist too quickly or too slowly. In the case of listing the new segments in the playlist too quickly, the client device 120 may attempt to skip forward, thus causing jitter. In the case of listing the new segments in the playlist too slowly, the client device 120 may experience buffer underflow. On the other hand, if video segments are made available after the video segment would have finished being presented, then the corresponding audio buffer may experience underflow, i.e., the corresponding audio may not have been included in that segment.

To compensate for the variable offset between the transmission time of video frames and audio frames, in some embodiments, the demultiplexer 112 demultiplexes the broadcast stream 101 so that components in the component elementary streams 103 can be aligned (and not simplistically sliced). As such, the demultiplexer 112 described herein in accordance with some embodiments is advantageous over a simple slicer and prepares for the alignment of presentable audio and video content.

FIG. 1 further illustrates an exemplary format of the encrypted segments 105 in accordance with the HLS protocol. In some embodiments, a respective encrypted segment 105 includes a program association table (PAT) 130, a program mapping table (PMT) 132, video data 134, timed text data 135 (e.g., teletext, captions, subtitles, and/or timed text, etc.), audio data 136, and a public key cryptography standard 7 (PKCS7) padding 138, among others. In some embodiments, to generate the exemplary encrypted segment 105, the segment builder 114 begins building the segment with the PAT 130 and the PMT 132. The segment builder 114 then includes the video packets, which follow video packets packaged in a previous segment, until consecutive video frames for the presentation time range associated with the respective segment 105 are captured and included in the video data 134. Upon detecting the end of the video frames for the presentation time range, the gateway device 110 adds (e.g., appending) the timed text data 135. In some embodiments, consecutive timed text frames for the presentation time range associated with the respective segment 105 are included in the timed text data 135. In some embodiments, the segment builder 114 re-packetizes the timed text PES packets into TS packets. Upon detecting the end of the timed text data of the respective segment 105, the gateway device 110 includes the audio frames in the audio data 136 until consecutive audio frames for the presentation time range associated with the respective segment 105 are captured. In some embodiments, the segment builder 114 re-packetizes the audio PES packets into TS packets. The segment builder 114 then adds (e.g., appending) the appropriate PKCS7 padding 138 to the end of the respective segment 105 and encrypts the respective segment 105 using AES-128 in accordance with some embodiments.

In some embodiments, each of the encrypted segments 105 in the exemplary in-home streaming system 100 has a fixed segment duration (e.g., 1 second) that includes complete frames of video. As will be described in further detail below, due to the different frame durations used for audio and video, there may be some small delta between the audio and video durations within the segment. However, such small delta is not accumulative across multiple segments. In some embodiments, the gateway device 110 segments the component elementary streams, e.g., the video, audio, and/or the timed text streams, at the start of streaming to ensure that the first segment starts from a RAP.

Although the exemplary segment shown in FIG. 1 includes the video data 134, the timed text data 135, and the audio data 136, in some embodiments, the video data 134 is not present in the encrypted segment for radio services. In some other embodiments, the timed text data 135 is not present when the broadcast content does not include a timed text track. Further, in some embodiments, the audio data 136 and the timed text data 135 have their own playlists and segments (e.g., as described in a master manifest). In such embodiments, the video data 134 may be provided in the MP2 TS segments as described by a video playlist, whereas the audio data 136 and the timed text data 135 are packaged in accordance with the respective standards.

It should be noted that while some of the embodiments described herein reference adaptive streaming signaling processing, encoding, decoding, and encryption in accordance with the HLS protocol, any other suitable adaptive streaming protocols (e.g., standards and/or protocols that support the delivery of various types of content as shown in FIG. 2) may be used in place of and/or in conjunction with the HLS protocol. As such, the in-home streaming system 100 described herein can be implemented pursuant to other suitable adaptive streaming protocols.

It should also be noted that in some embodiments, the system 100 includes more, less, and/or different elements than shown in FIG. 1. Each of the elements of system 100 includes appropriate hardware, software, and/or firmware to perform the operations attributed to the element herein. Some examples of appropriate hardware, software, and/or firmware for certain elements will be provided further below. Operation(s) attributed to an element of system 100 herein should not be considered binding and in some embodiments, other element(s) in the system 100 may additionally or alternatively perform such operation(s).

Figure 3:
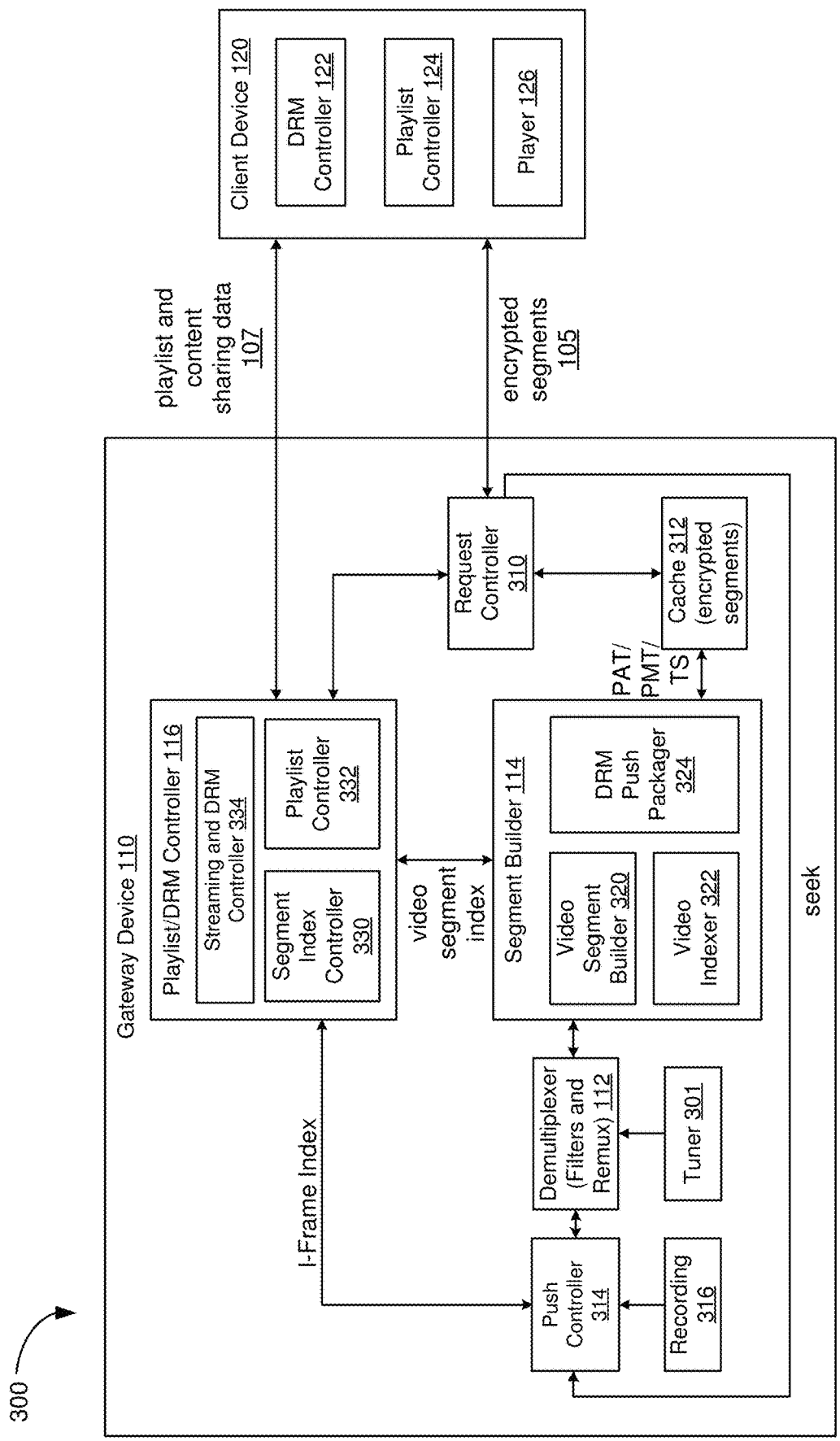
FIG. 3 is a block diagram of an exemplary in-home streaming system, in accordance with some embodiments.

FIG. 3 is a block diagram illustrating an exemplary in-home streaming system 300 in accordance with some embodiments. In some embodiments, the exemplary in-home streaming system 300 includes the gateway device 110 and the client device 120 as described above with reference to FIG. 1. In addition to the components, modules, and/or units shown in FIG. 1, in some embodiments, the gateway device 110 also includes a request controller 310 for managing requests from the client device 120, a cache 312 (e.g., non-transitory storage medium) for storing encrypted segments (e.g., the encrypted segments 105, FIG. 1), a push controller 314 for facilitating playback of recording, recording 316, and/or a tuner 301 for tuning into broadcast, among others. In some embodiments, the push controller 314 controls and/or acquires content from the recording 316. Further, in some embodiments, the push controller 314 uses the I-frame index data for controlling which parts of the recording 316 is injected, where the I-frame index comes from the recording. In such embodiments, for playlist generation, the segment index controller 330 then uses the recording directly. This is useful when a segment that is not consecutive to the current available segments is requested.

In some embodiments, the request controller 310 reads data from the cache 312 to serve requests from the client device 120 and/or directs the push controller 314 to locate data in the recording 316 according to the requests. In some embodiments, in response to the requests from the request controller 310, e.g., seeking a particular recording, the push controller 314 reads data from the recording 316 and feeds the data to the demultiplexer 112 to seed and pace the segment builder 114. Further, the push controller 314 identifies the I-frame index generated at recording for playlist generation.

To feed the data through the demultiplexer 112 without overflowing an output buffer of the demultiplexer 112 and/or the audio/timed text elementary stream filters and their associated buffers, in some embodiments, the push controller 314 blocks the pipeline in response to detecting insufficient space in the demultiplexer 112 and/or the elementary stream filters/buffers. In some embodiments, the push controller 314 also periodically checks whether new content can be injected based on whether there is space in the buffers of the demultiplexer 112 and/or whether there is new content in the recording 316 that can be injected (e.g., ongoing recording).

In some embodiments, the segment builder 114 includes a video segment builder 320, a video indexer 322, and a DRM push packager 324. In some embodiments, the video indexer 322 analyzes the demultiplexed video data from the demultiplexer 112 and detects the start of each payload unit start indicator (PUSI) and its associated presentation timestamp (PTS) values. The video indexer 322 then provides the PUSI and the PTS values to the video segment builder 320. The video segment builder 320 uses the PUSI and the PTS values for constructing segments.

In some embodiments, the video segment builder 320 receives the re/de-multiplexed streams, e.g., audio, video, and timed text streams, and constructs each segment from the re/de-multiplexed streams. In some embodiments, the DRM push packager 324 is responsible for packaging content into segments and encrypting as well as sending the encrypted segments 105 to the cache 312. The DRM push packager 324 also updates the video segment index to identify the location of packaged video segments within the cache 312. When a new segment is complete, the DRM push packager 324 informs a segment index controller 310 for playlist generation.

In some embodiments, the playlist and DRM controller 116 of the gateway device 110 includes the segment index controller 330, a playlist controller 332, and a streaming and DRM controller 334 for managing network streaming and DRM licenses. The segment index controller 330 manages the video segment index to support playlist generation by the playlist controller 332. The segment index controller 330 is also connectable to the request controller 310 to fulfill the requests from the client device 120 in accordance with some embodiments.

In some embodiments, the segment index controller 330 generates the video segment index at the start of playback, where the video segment index is used for playlist generation (e.g., by the playlist controller 332), segmentation packaging (e.g., by the DRM push packager 324), and/or request management (e.g., by the request controller 310). In some embodiments, the segment index controller 330 also calculates the nominal start and end of a presentation time range of each video segment in the recording 316 based on the I-frame index generated at recording time, e.g., retrieved from the recording 316. In some embodiments, the segment index controller 330 further identifies periods as well as interruptions in the recording 316. A period, as used herein, represents a collection of consecutive playback content. Where there are interruptions, a period is ended and a new period is created after the interruption. As such, based on the video segment index, the segment index controller 330 is aware of which segments are complete. In some embodiments, the playlist controller 332 calls an API to push changes to the playlist to the client device 120. Controlling the timing of the availability of the segments in the playlist and pushing changes have several advantages.

First, controlling the timing of the availability of the segments in the playlist avoids a race condition and avoids HLS polling delays for growing content. HLS is based around playlists. For each segment listed in a respective playlist, there is an associated Uniform Resource Identifier (URI). For growing content (e.g., linear services and/or ongoing recordings), the client device 120 polls for updates to the playlist so that it can obtain the URIs to download the latest segment(s). HLS specifications exist for when a client device polls for an updated playlist. Namely, for example, if the client device reloads a playlist file and finds that it has not been changed, the client device waits for a period of one-half the target duration before retrying polling for updates. As such, a race condition may happen where the client device polls for an update, finds no change, and then is forced to wait for half a target duration. The wait makes the client device 120 more prone to underflow because its local buffer would be half a target duration lower. In accordance with some embodiments, the playlist and DRM controller 116 publishes the encrypted segments 105 in the playlist at the nominal time the segments are scheduled to be available (e.g., according to the PCR timeline), but may not be actually available due to the encryption and/or writing to the storage. As such, using PCR to publish the segments minimizes the risk of the race condition and ensures a regular cadence.

Second, pushing playlist changes minimizes playlist bandwidth. The size of the playlist can increase over time during streaming. In some home environments, the bandwidth consumed for regular and repeated transfer of the growing playlist can take an appreciable fraction of the available bandwidth, thus increasing the chance of the client experiencing underflow. Further, while streaming growing HLS content from substantially close to the live point, the client device 120 periodically polls for playlist updates so that the client device 120 can obtain the full playlist (e.g., to determine the URIs of the latest segment(s)). However, most of the content of the playlist does not change. As such, pushing the playlist changes by the playlist controller 332 reduces the network traffic associated with growing content and conserves the resources on the gateway device 110 associated with the playlist generation.

Further, in some embodiments, the exemplary system 300 provides summary metadata about each period that is available in a recording or for live broadcast across the network. In some embodiments, the exemplary system 300 also provides information about the range of segments that is currently available across the periods. Such information about the range of segments is updated periodically to indicate when a new segment is available or, in the case of live broadcast, indicate when a segment is no longer available for timeshifted content. The combination of the summary metadata and the range of segment allows a client device to render the playlist on the client device 120 and hence avoids large playlist documents having to be sent across the network every target duration. Once the playlist changes are pushed to the client device 120, when the player 126 on the client device 120 requests the media playlist from a local URI on the client device 120, the playlist controller 124 on the client device 120 generates the playlist. Thus, through the playlist controllers 332 and 124, a broadcaster streaming satellite content within a home has control over the playlist updates on both the gateway device 110 and the client device 120.

Figure 4:
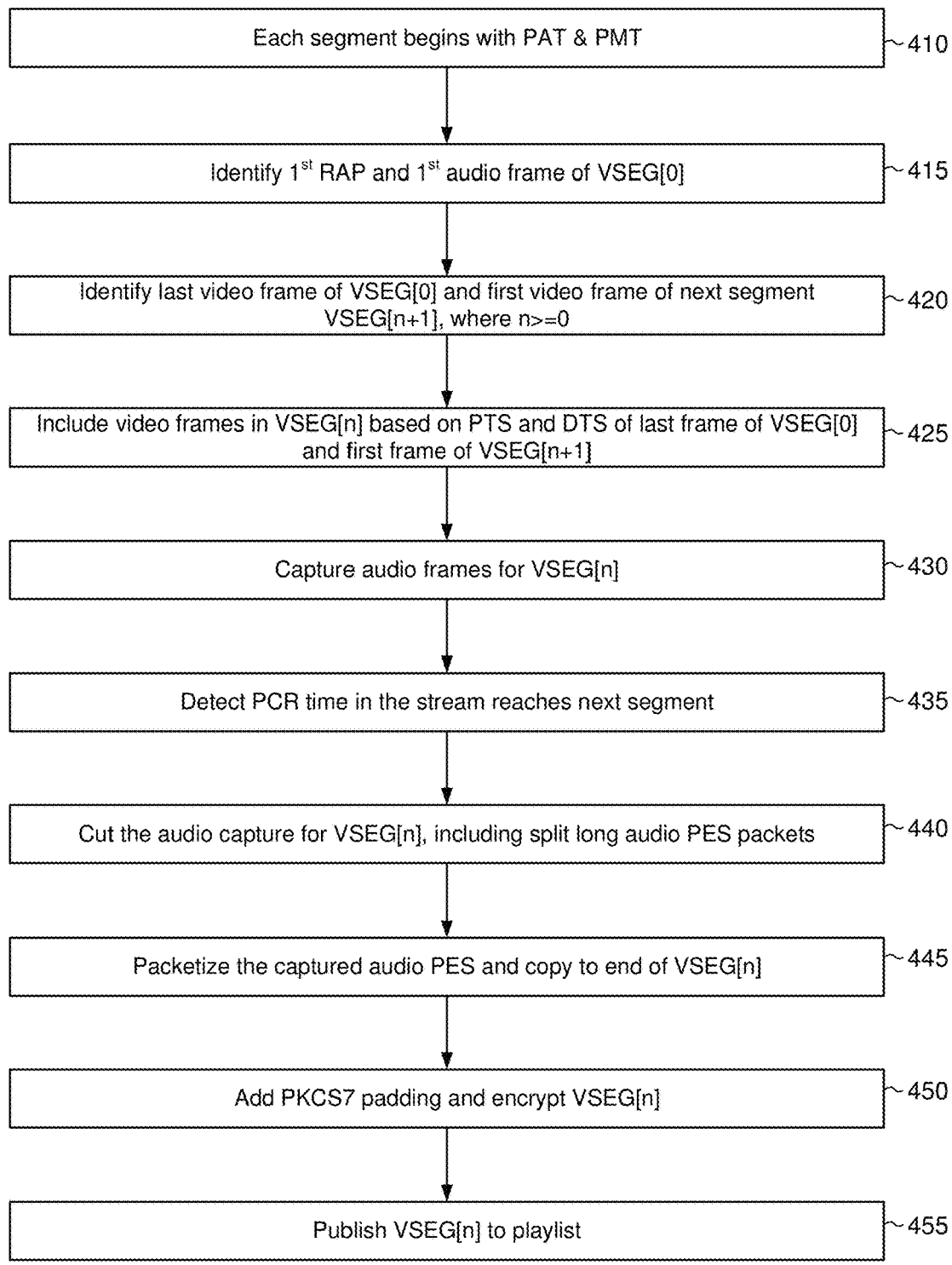
FIG. 4 is a flowchart illustrating a segmentation method for in-home streaming, in accordance with some embodiments.

FIG. 4 is a flowchart illustrating a segment building method 400 for broadcast in-home streaming in accordance with some embodiments. In some embodiments, the method 400 is performed by the segment builder 114 (FIG. 1). As represented by block 410 and as described above with reference to FIG. 1, each segment begins with a PAT and a PMT. As represented by block 415, for the first segment, denoted as VSEG[0], the segment builder identifies the first RAP (e.g., an I-frame) in the demultiplexed video stream and the first audio frame in the demultiplexed audio stream. As will be described in further detail below, the segment builder identifies the presentation time range of each segment by anchoring a fixed duration segment, e.g., 1 s, based on the timestamps of the first RAP and the first audio frame.

For each segment VSEG[n], when n>=0, as represented by block 420, the segment builder locates the first video frame for the next segment, denoted as VSEG[n+1], and the last video frame for segment VSEG[n]. As represented by block 425, based on the PTS and the decoding timestamp (DTS) of the first video frame for VSEG[n+1] and the last video frame for the segment VSEG[n], the segment builder includes video frames in VSEG[n]. The segment builder, as represented by block 430, further captures audio frames for VSEG[n].

In some embodiments, capturing the audio frames for VSEG[n] includes splitting an audio PES packet, e.g., a long audio PES packet. Satellite systems often transmit multiple audio frames within each PES packet. The duration of the combined audio PES packet can be 300 ms or greater. The end of the audio PES packet may still be broadcasted while the start of the audio frames in the PES packet is decoded. When the PCR reaches the PTS of the next segment, for a long audio PES packet that straddles two consecutive segments, waiting until the audio PES packet has been fully acquired delays the completion of the segment and potentially leads to underflow on the client end. On the other hand, excluding the long audio PES packet from the current segment makes the audio content of the segment shorter than its nominal duration, which again potentially leads to underflow on the client end. Because the audio stream has been demultiplexed from the rest of the content, as shown and described above with reference to FIG. 1, it is possible to split the elementary stream corresponding to the audio content. In some embodiments, as represented by block 435, the segment builder detects when the PCR time in the stream reaches the next segment, the segment builder, as represented by block 440, cuts the audio capture for VSEG[n]. In accordance with such embodiments, for a long audio PES packet that straddles the presentation time range of two adjacent segments, the segment builder splits the long audio PES packet when the PCR time reaches the PTS of the start of the next segment.

Still referring to FIG. 4, as represented by block 445, upon reaching the beginning of the next segment, the segment builder packetizes the captured audio PES and copies (e.g., appending) the audio PES to the end of VSEG[n]. In some embodiments, as represented by block 450, the segment builder adds padding (e.g., appending the PKCS7 padding) and encrypts VSEG[n]. As represented by block 455, the segment builder then publishes VSEG[n] to the playlist.

In some embodiments, HLS allows a client to perform trick modes by requesting an I-frame playlist. For growing content, accordingly to HLS, the I-frame playlist has the same target duration as other playlists. For live content, as described above, the broadcast content is segmented by the gateway device as it is received to ensure that each I-frame is complete within a single segment. Typically, most satellite services have a GOP length that is shorter than the target duration, so there is at least one I-frame within each segment. A subset of services may, on occasion have GOP lengths greater than the target duration. As such, there may be no I-frames within a given segment's presentation timeline. Accordingly, in some embodiments, when there is at least one I-frame within a segment timeline, an I-frame playlist generated by the system references those I-frames via the precise byte offsets of any I-frame within each segment in accordance with some embodiments. On the other hand, when there is not at least one I-frame within a segment timeline, that portion of the I-frame playlist generated by the system references a prior segment's I-frame in accordance with some embodiments. This approach reduces extra processing on the gateway device, e.g., avoid generating a dedicated set of I-frame segments.

For playback, in some embodiments, the I-frame playlist does not include byte ranges for accessing the I-frame within a segment. Instead, the I-frame playlist includes a list of segments. When the segment is requested, the system locates a relevant I-frame associated with the corresponding segment time period in the recording and generates a segment that includes the I-frame, e.g., an I-frame only segment comprising the relevant I-frame. On the other hand, in the case of a particular segment time range not including an I-frame, the system selects a nearby I-frame and returns the nearby I-frame instead.

Figure 5A:
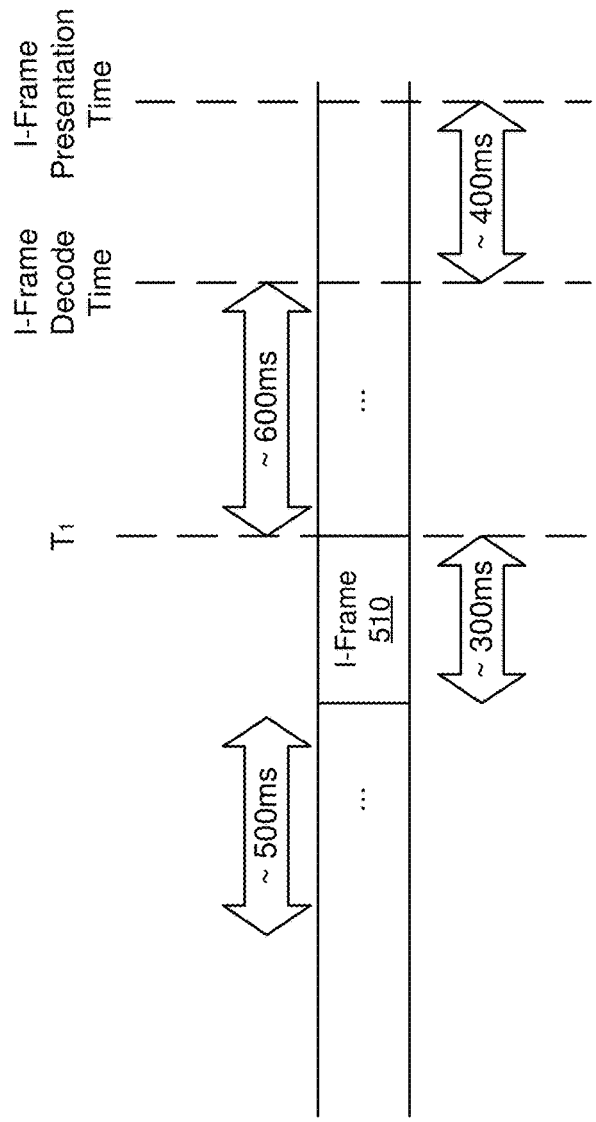
FIGS. 5A and 5B are diagrams illustrating incremental delays of an exemplary video frame in broadcast service and an exemplary segmentation alignment method for compensating the incremental delays, in accordance with some embodiments.

FIG. 5A is a diagram 500A illustrating incremental delays of an exemplary video frame in broadcast service. There are several intrinsic delays to when a moving picture can be seen. As described above, a satellite broadcaster routinely transmits video ahead of the corresponding audio (typically by one or more seconds). When an STB tunes to a satellite stream, there is typically a period of time where the audio data could be presented, but no corresponding video data would have been received, as the video data was broadcasted ahead of time and the STB had not been tuned to the stream at that time. As such, the video and audio data in broadcast can be misaligned due to the difference in the transmission start time. Further contributing to the misalignment is the incremental delay of video frames as shown in FIG. 5A.

In FIG. 5A, for an exemplary I-frame 510 in a group of pictures (GOP) structure, it takes approximately 500 ms to reach the start of the I-frame 510 and approximately 300 ms to reach the end of the I-frame 510 at $T_1$ (e.g., approximately 300 ms for transmitting the I-frame 510). The time from $T_1$ to when the I-frame 510 is decoded is approximately 600 ms, and then to when the I-frame 510 is presented is approximately another 400 ms.

Ignoring other delays, after approximately 800 ms (i.e., the 500 ms time to reach the start of the I-frame 510+300 ms transmission time of the I-frame 510), an STB receives the full I-frame 510. The video presentation of the I-frame 510 can reliably start roughly one second later (i.e., 600 ms from $T_1$ to the decoding time+400 ms from the decoding time to the presentation time). As such, one second is the difference between when the I-frame 510 finishes being transmitted at $T_1$ and when the PTS time of the I-frame reaches the PCR of the stream, e.g., the presentation time of the I-frame 510. By the nominal time that the I-frame 510 is presented, the STB may have received around 1.8 seconds of audio due to the incremental delay of the time to reach the I-frame 510, the time to transmit the I-frame 510, the time to reach the decoding of the I-frame 510, and the time to reach the presentation of the I-frame 510.

In some embodiments, STB drivers optimize video presentation using a first frame preview method. Using the first frame preview method, as soon as the I-frame 510 is fully transmitted (e.g., at time $T_1$), it is previewed as a static video frame, e.g., ahead of when it should have been presented based on the PCR. At the same time, the audio starts decoding based on the PTS values of the audio and the PCR value of the current stream. When the PCR time reaches the PTS of the I-frame 510, the video starts running and synchronizes with the audio. The first frame preview method provides a better user experience when changing channels, e.g., giving early audio and visual feedback ahead of audio/video (AV) synchronization.

To reduce the time that it takes to appear to start presenting, in some embodiments, at the start of streaming, the gateway device (e.g., the gateway device 110) establishes how much leading audio there is ahead of the first video RAP (e.g., an I-frame). The gateway device further establishes the earliest nominal segment start point that has at least one RAP (given that that segment can be no longer than the target duration). The gateway device then edits the PTS value of the video RAP so that it appears to start at the same time as the leading audio frame. In some embodiments, the gateway device also ensures that there is at least one extra video frame in that segment (e.g., presented after the RAP) to reduce the chance of the client decoder reporting an underflow. As such, a video frame is brought forward from the presentation time range of the next segment without its PTS value being modified in accordance with some embodiments. In other words, the gateway device maintains the PTS values of some video frames when bringing forward such frames for decoding purpose.

Figure 5B:
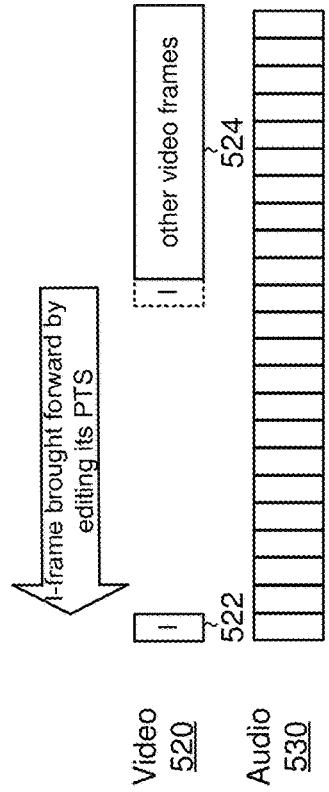

A simplified view of the aforementioned approach is shown in a diagram 500B in FIG. 5B. The diagram 500B shows video frames 520 and audio frames 530 that are within a segment of HLS content. As depicted in the diagram 500B, the first frame among the video frames 520 is an I-frame 522. The segment of HLS content also includes at least one extra frame transmitted after the I-frame 522 and presented after the I-frame 522, e.g., other video frames 524 such as Bi-directional frames (B-frames) and/or delta-frames (also known as P-frames). In some embodiments, the in-home streaming system in accordance with various embodiments described herein decides how many leading frames of the audio frames 530 are inserted into that first segment. Once that is calculated, the PTS time of the I-frame 522 is brought forward to align with the audio frame 530 so that the client device can start its audio and video decoders at the same time and the first audio and video frames of each segment have the same presentation timestamp. In some embodiments, the PTS time of the I-frame 522 that is brought forward is calculated at least in part based on a target duration.

A target duration (also referred to as an integer HLS target duration) is the maximum duration of a segment in HLS (when the duration of the segment is rounded to the nearest second). Typically, an end user wishes to start viewing content as soon as it can be reliably and continuously consumed. Given that the gateway device tunes to the broadcast service on request, it is desirable to have the integer HLS target duration as small as permitted. The smaller target duration minimizes the amount of time from the initial frame of video being received (e.g., at time $T_1$ in FIG. 5A) until each whole segment can be downloaded. As such, in some embodiments, the target duration is one second, e.g., capturing 1 second of audio starting from time $T_1$ in FIG. 5A and package in a segment for download along with the video frames.

Figure 6A:
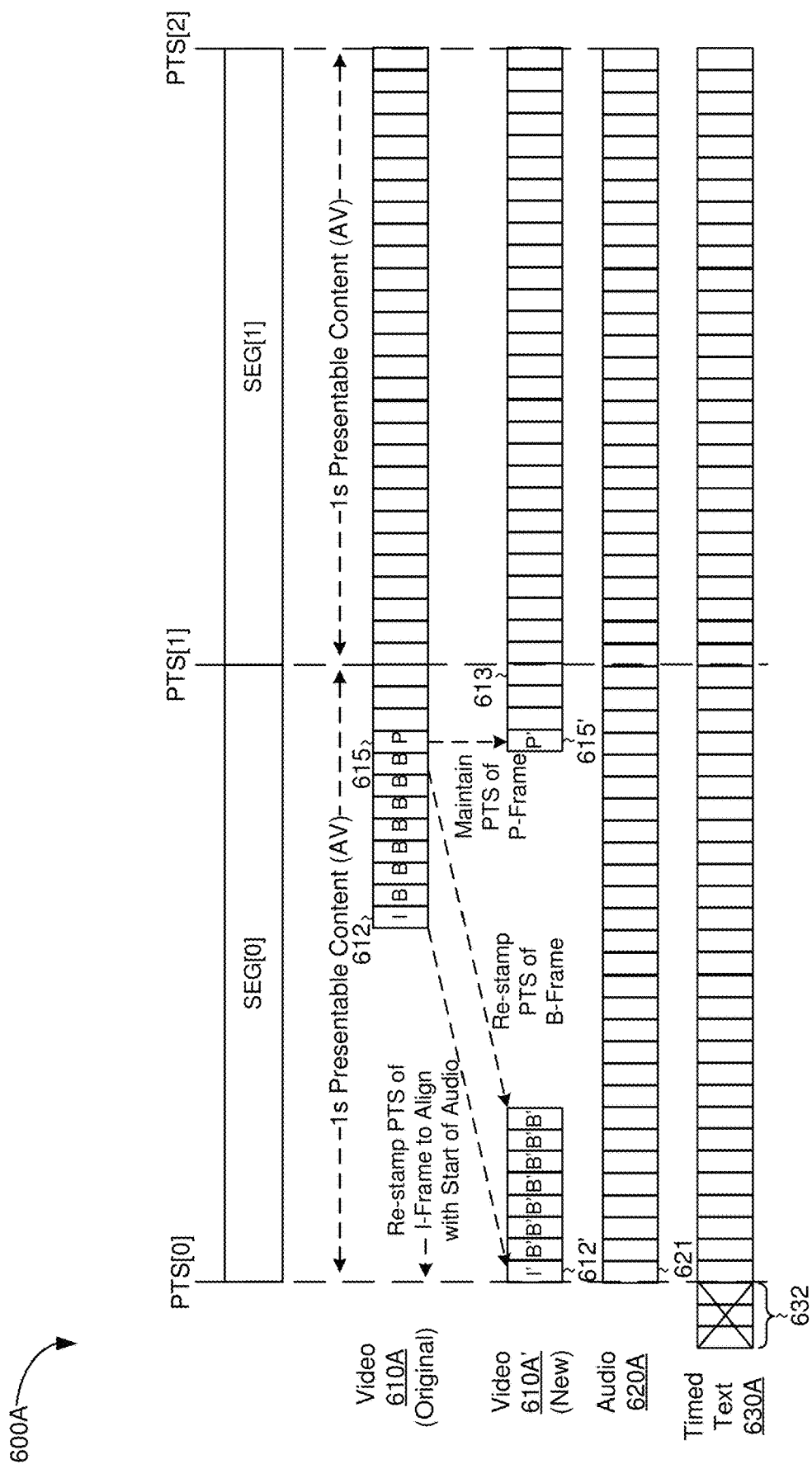
FIGS. 6A and 6B are diagrams illustrating aligning frames in exemplary demultiplexed streams during segmentation for in-home streaming, in accordance with some embodiments.
Figure 6B:
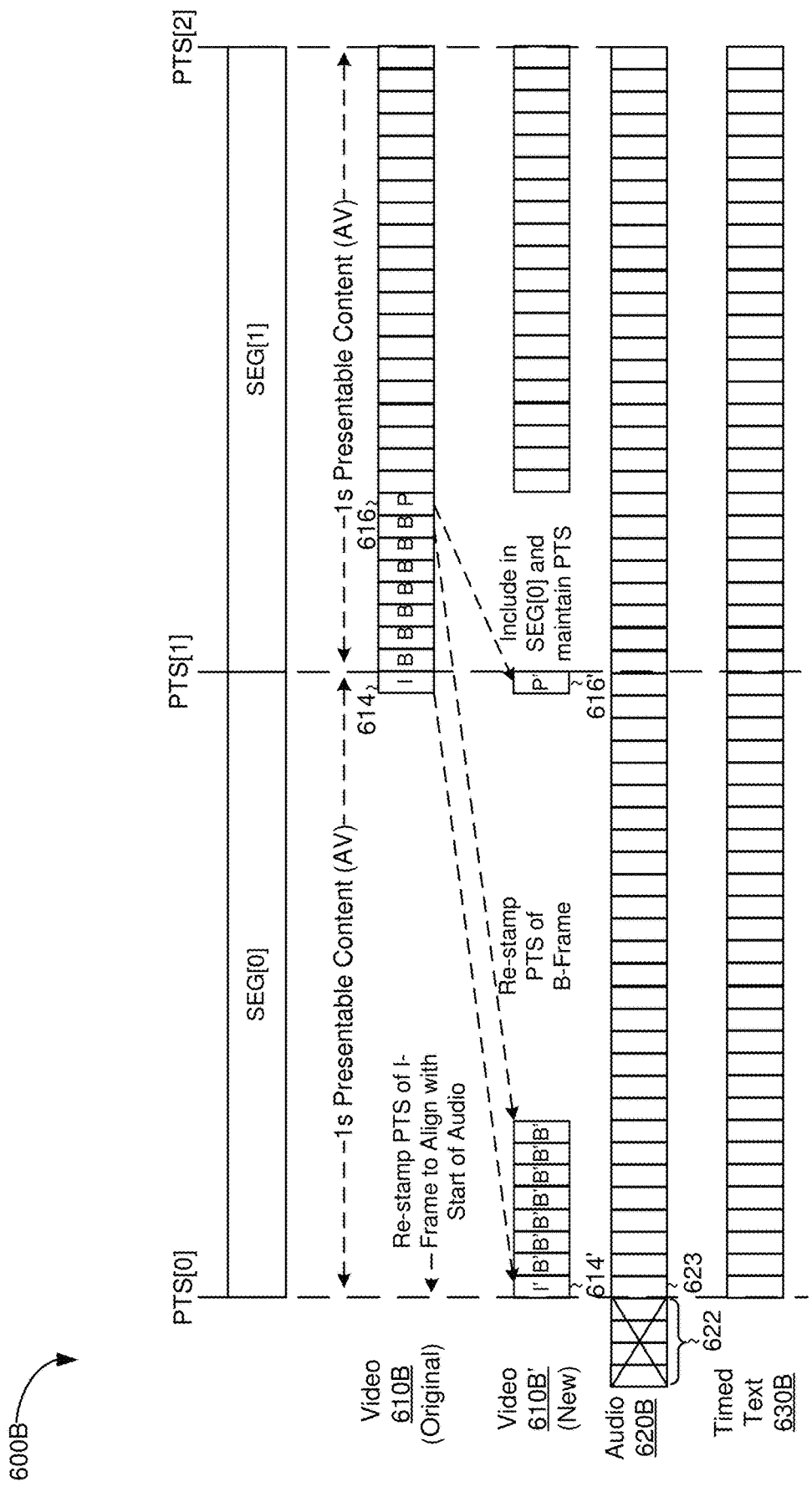

FIGS. 6A and 6B are diagrams 600A and 600B illustrating aligning frames in exemplary demultiplexed streams during segmentation for broadcast in-home streaming in accordance with some embodiments. The exemplary demultiplexed streams include one or more of a video stream 610A, an audio stream 620A, and a timed text stream 630A as shown in FIG. 6A or one or more of a video stream 610B, an audio stream 620B, and a timed text stream 630B as shown in FIG. 6B. As described above with reference to FIGS. 5A and 5B, in a steady state, the gateway device includes the video and audio frames that fall within the duration of a respective segment. The initial segment(s) include the corresponding duration of audio and video frames, and the first audio and video frames included in each segment have the same presentation timestamp. Otherwise, the client device might skip forward over leading audio frames and start playback from deeper within the segment, potentially making the client device more prone to subsequent underflows.

To implement the aforementioned segmentation and alignment approach, in FIG. 6A, the gateway device establishes that the leading audio presentation time of a first audio frame 621 in the audio stream 620A is less than one target duration earlier than the first RAP, e.g., an I-frame 612 in the video stream 610A. The gateway device further establishes the earliest nominal segment start point that has at least one I-frame 612 is at PTS[0], which is aligned with the PTS of the audio frame 621. As such, the gateway device anchors the first presentation time range for the first segment (denoted as segment[0]) that begins at PTS[0] and ends at one target duration later, e.g., at PTS[1].

The gateway device then edits the PTS value of the I-frame 612 to align with the PTS value of the first audio frame 621 in the audio stream 620A. Specifically, as indicated by the dashed arrow from the I-frame 612 to the I-frame 612', the gateway device modifies (e.g., re-stamps) the PTS of the I-frame 612 to generate the re-stamped I-frame, denoted as I' 612' in FIG. 6A. The re-stamped I-frame 612' is aligned with PTS[0], which is PTS of the first audio frame 621 in the audio stream 620A. The re-stamping of the PTS value of the I-frame 612 makes the I-frame 612' appear to start at the same time as the leading audio frame 621. The gateway device also modifies (e.g., re-stamps) the PTS of a plurality of B-frames following the I-frame 612 in the video stream 610A to follow I' frame 612' in the video stream 610A', where the plurality of B-frames has an earlier PTS than the original I-frame 612. In some embodiments, the gateway device includes the re-stamped plurality of B-frames for simplicity, for generating a valid segment, and/or for reducing the chance of the client decoder reporting an underflow. On the receiving end, in some embodiments, the decoder discards the plurality of B-frames and the I' frame 612' is presented for the duration of segment[0].

In some embodiments, the gateway device also determines the number of additional video frames to complete the first segment by locating the last frame of segment[0], e.g., a frame 613, and includes additional frames from the video stream 610A in segment[0] based on decoding timestamp (DTS) and PTS values. The additional frames included in segment[0] ensures that the presentation time range of the video aligns with the segment. In some embodiments, as shown in FIG. 6A, a P-frame 615 is also included in segment[0] and is not re-stamped, e.g., the PTS of the P-frame 615 is maintained and/or not modified. As such, even though the P-frame in the video stream 610A' (denoted as P' 615' in FIG. 6A) is included in segment[0], it would be presented according to its original presentation timestamp. The inclusion of the P-frame 615 in segment[0] ensures that there is at least one extra video frame with a later PTS than the original I-frame 612 included in segment[0]. In some embodiments, the gateway device does not include a few timed text frames 632 in segment[0], where such timed text frames 632 in the demultiplexed timed text stream 630A do not have corresponding presentation timestamps within the presentation time range associated with segment[0].

In FIG. 6B, the gateway device establishes that the leading audio presentation time is more than one target duration earlier than the first RAP, e.g., an I-frame 614 in the video stream 610B. As indicated by the dashed arrow from the I-frame 614 to the I'-frame 614' (denoted as I' 614 in FIG. 6B), the gateway device modifies the PTS of the I-frame 614 by one target duration earlier and anchors the first presentation time range for segment[0] that begins at PTS[0] and ends one target duration later at PTS[1]. The re-stamped I-frame, i.e., I' 614', in the video stream 610B' has a modified PTS value of PTS[0]. The gateway device further excludes from segment[0] a few audio frames 622 that do not have presentation timestamps within the presentation time range between PTS[0] and PTS[1]. As such, a first audio frame 623 in the audio stream 620B and the I-frame 614' are aligned within segment[0].

In some embodiments, the gateway device also modifies (e.g., re-stamps) the PTS of a plurality of B-frames following the I-frame 614 in the video stream 610B to follow I' frame 614' in the video stream 610B' for reasons explained above with reference to FIG. 6A. In some embodiments, a P-frame 616 that is also included in segment[0] is not P-frame re-stamped, denoted as P' 616' in the video stream 610B', and would be presented according to its original presentation timestamp. In other words, the gateway device maintains the PTS of the P-frame 616 so that the PTS of the P-frame 616 remains the same when the P-frame 616 is included in segment[0]. In some embodiments, the gateway device captures frames from the timed text stream 630B that have presentation timestamps within the presentation time range of segment[0] and appends to the video frames from the video stream 610B'.

In both examples shown in FIGS. 6A and 6B, when an HLS client device (e.g., the client device 120, FIG. 1) decodes each segment, the first video frame (e.g., the first I-frame 612' in FIG. 6A or the first I-frame 614' in FIG. 6B) is decoded at the same time as the first audio frame (e.g., the audio frame 621 in FIG. 6A or the audio frame 623 in FIG. 6B) in each segment. In some embodiments, the video frame remains displayed while the subsequent audio frames (e.g., the audio frames subsequent the audio frame 621 in FIG. 6A or the audio frames subsequent the audio frame 623 in FIG. 6B) are decoded. Once the playback position reaches the PTS of the next presentable video frame after the initial RAP, the video playback will continue smoothly. As such, the segmentation and alignment method described herein enables the playback to appear to start up to one target duration earlier than otherwise would have been the case.

Figure 7:
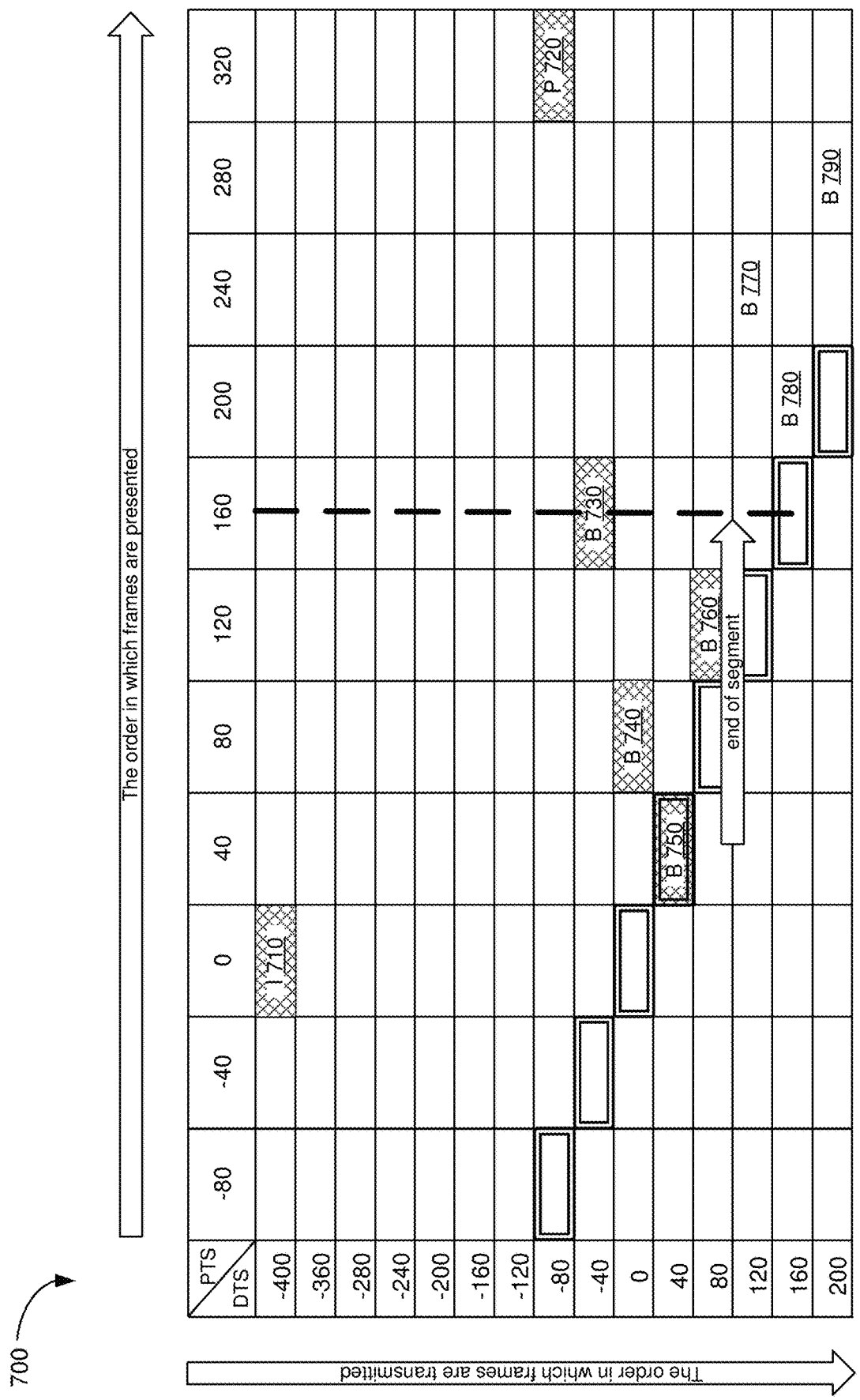
FIG. 7 is a diagram illustrating segment building based on the order in which exemplary video frames are transmitted (also decoded) and the order in which the exemplary video frames are presented, in accordance with some embodiments.

FIG. 7 is a diagram 700 illustrating segment building based on the video transmission order as well as the video presentation order in accordance with some embodiments. In FIG. 7, the arrow along the vertical axis shows the order in which a plurality of exemplary video frames 710-790 is transmitted and decoded. For example, I-frame 710 is first transmitted at a DTS time of −400 ms. P-frame 720 is then transmitted at a DTS time of −80 ms. A plurality of B-frames 730-790, each with 40 ms in presentation duration, is then transmitted starting at a DTS time of −40 ms. Further shown in FIG. 7, the arrow along the horizontal axis indicates the order in which the plurality of video frames 710-790 is presented, e.g., I-frame 710 with PTS of 0ms is presented followed by B-frame 750 with PTS of 40 ms, then followed by B-frame 740 with PTS of 80 ms, etc. The rectangles with bold double borders show when each frame is presented.

The example shown in FIG. 7 illustrates the added complexity of video transmission in broadcast. In satellite streams, the frames 710-790 are not typically broadcasted in the order in which they are presented. In particular, B-frames are not always transmitted according to the presentation orders. B-Frames by definition are bi-directional frames, namely, they depend on frames presented before and after. Thus, B-frames can be inserted in-between two reference frames (e.g., I-frames and/or P-frames). As such, I-frames and P-frames are often transmitted (and decoded) ahead of B-frames that are derived from I/P-frames.

To ensure a continuous presentation range within the segment for in-home streaming, upon finding the last frame for the presentation time range of the segment, the gateway device continues iterating through the video stream until any gaps in the presentation timeline are filled. It should be noted that the method described herein for ensuring a continuous presentation range is not limited to the first segment. For any segments along the presentation timeline, the gateway device can apply the method described herein to iterate through the video stream until gaps in the presentation timeline are filled in accordance with some embodiments. In some embodiments, the gateway device includes in the video segments all frames that are necessary to present the segment along its presentation timeline. Such frames, in some embodiments, include a reference frame from the following segment presentation timeline. For example, as described above and shown in FIG. 6B, segment[0] includes the P-frame 616 from segment[1] presentation timeline. In the example shown in FIG. 7, video frames are inspected in the transmission order, e.g., first inspecting I-frame 710, then P-frame 720, and then the plurality of B-frames 730-790. Also shown in FIG. 7, the gateway device determines that a segment ends at a PTS time of 160 ms, as indicated by the dashed line. The gateway device then iterates through the frames in transmission order (e.g., following the downward arrow along the vertical axis) to locate a frame with the desired PTS value of 160 ms, e.g., B-frame 730 with a PTS value of 160 ms and a decode time of −40 ms. Once B-frame 730 is located, the gateway device determines that the frames 740-760 with PTS values of 40, 80, and 120 ms, which are within the presentation time range of the segment, had not been received yet. As such, the gateway device determines that the segmentation does not end at B-frame 730 to avoid any gaps in the presentable content. In other words, ending at B-frame 730 would cause a gap in the presentation time range of the segment.

To fill the gap, in some embodiments, the gateway device continues iterating in the transmission order (e.g., following the downward arrow along the vertical axis in FIG. 7) until the next frame with a presentation timestamp after B-frame 730 is found. In FIG. 7, after iterating through B-frames 740-760, the gateway device ends the iteration upon locating B-frame 770 with a presentation timestamp of 240 ms, which is after the presentation timestamp of B-frame 730. Thus, B-frames 740-760 with relative PTS values before the presentation timestamp of B-frame 730 are included in the segment. On the other hand, B-frames 770-790 that have PTS values after the presentation of B-frame 730 are not included in the segment and would be included in the next segment.

At DTS of −80 ms, P-frame 720 is transmitted earlier than B-frame 730 but presented after B-frame 730, e.g., P-frame 720 with DTS of −80 ms vs. B-frame 730 with DTS of −40 ms and P-frame 720 with PTS of 320 ms vs. B-frame 730 with PTS of 160 ms. Because P-frame 720 is necessary for decoding, P-frame 720 is included in the segment. Thus, the frames 710-760 (shaded in FIG. 7) that are necessary for a continuous presentation range within the segment are pulled in the segment. In contrast, the frames 770-790, which are not necessary for decoding any frames within the segment along its presentation timeline, are not included in the segment.

In accordance with the segmentation method described herein, in the case of missing the start of one or more video frames due to the poor satellite reception, the DTS values and stream time (e.g., locked to the PCR) can be used to ensure that the segment is completed in a timely way. The aforementioned approach ensures that a client device playing from the start of content would be able to play for the expected duration (e.g., based on the number of segments downloaded and their segment duration). As described below in further detail, the segmentation method described herein also ensures that the client device can reliably decide when it can start playback based on the segment duration information in the playlist.

Figure 8:
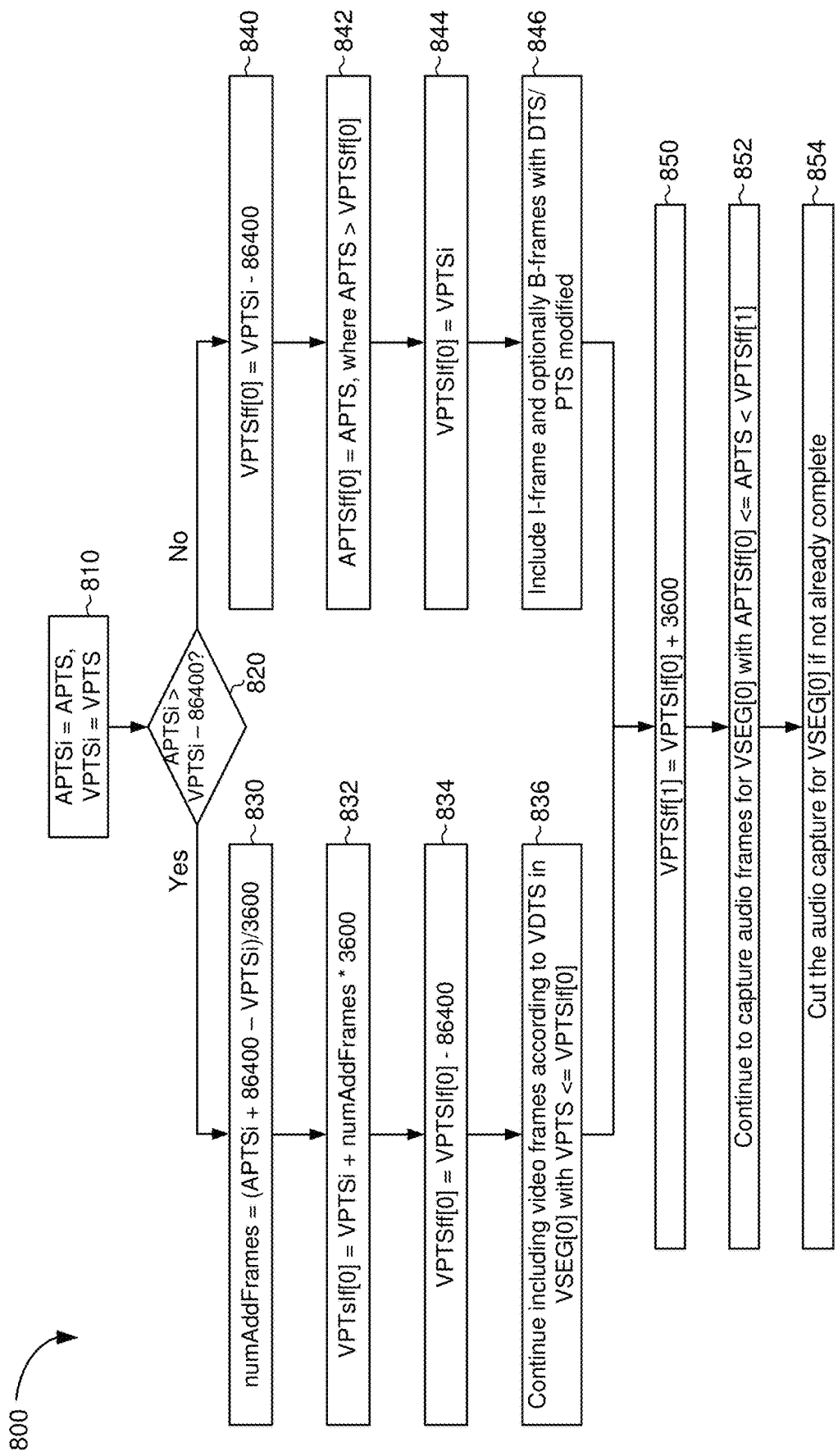
FIG. 8 is a flowchart illustrating an exemplary segmentation and alignment method for in-home streaming, in accordance with some embodiments.

FIG. 8 is a flowchart illustrating an exemplary segmentation and alignment method 800 in accordance with some embodiments. In some embodiments, the segment and alignment method 800 is performed by the segment builder 114 (FIG. 3) and corresponds to the steps represented by blocks 415-440 in FIG. 4. In some embodiments, based on the frame rate of 25 frames per second in a phase alternating line (PAL) system for broadcast TV, each frame referenced in the exemplary method 800 is 40 ms long. In such embodiments and in accordance with the embodiments of a target duration of 1 s, when re-stamping I-frame 614, the PTS is reduced by 960 ms, e.g., is target duration minus 40 ms. In some embodiments, the PTS values are based on a 90 kHz clock resolution. In such embodiments, the PTS values for 40 ms and 960 ms are 3600 and 86400 respectively, e.g., 40*90=3600 and 960*90=86400. These values can be different for content using different frame rates in different systems, e.g., National Television Standards Committee (NTSC) or Sequential Color and Memory (SECAM) systems.

In some embodiments, as represented by block 810, the segment builder acquires the first audio frame from the demultiplexed audio stream and obtains the first video I-frame of the first segment VSEG[0], e.g., APTSi=APTS and VPTSi=VPTS, where APTSi represents the PTS of the first audio frame (denoted as APTS) and VPTSi represents the PTS of the first video I-frame (denoted as VPTS) in the demultiplexed video stream. In some embodiments, acquiring the first audio frame and looking for the first video frame are performed in parallel. For example, as shown in FIG. 6A, the segment builder obtains the PTS values of the leading audio frame 621 in the audio stream 620A (APTS) and the I-frame 612 in the video stream 610A (VPTS), e.g., in parallel. The segment builder sets APTSi to the PTS value of the leading audio frame 621 and sets VPTSi to the PTS value of the I-frame 612, e.g., in parallel. In another example, in FIG. 6B, the PTS value of a leading audio frame in the audio stream 620B, e.g., the first one of the four audio frames eventually not included in segment[0], and sets APTSi to the PTS value of the leading audio frame, e.g., in parallel. In FIG. 6B, the segment builder also obtains the PTS value of the I-frame 614 in the video stream 610B (VPTS) and sets VPTSi to the PTS value of the I-frame 614, e.g., in parallel. As represented by block 820, the segment builder 114 determines whether or not the leading audio presentation time is less than 960 ms earlier than the first I-frame, e.g., whether or not APTSi>VPTSi−86400 (960 ms).

As represented by block 830, in the case of the leading audio presentation time being less than 960 ms earlier than the PTS of the first I-frame ("Yes"-branch from block 820), the segment builder calculates the number of additional frames for completing the first segment, e.g., numAddFrames=(APTSi+86400−VPTSi)/3600 (40 ms). As represented by block 832, the segment builder further determines the last frame PTS of VSEG[0], e.g., VPTSlf[0]=VPTSi+numAddFrames*3600 (40 ms), where VPTSlf[0] represents the PTS of the last video frame in VSEG[0]. In some embodiments, as represented by block 834, the segment builder also calculates the modified PTS to display the first I-frame 960 ms earlier than the last frame of VSEG[0], e.g., VPTSff[0]=VPTSlf[0]−86400, where VPTSff[0] represents the PTS of the first video frame in VSEG[0].

As represented by block 836, the segment builder continues including video frames in VSEG[0] according to the order of DTS, where the video frames included in VSEG[0] have corresponding PTSs before the PTS of the last video frame in VSEG[0]. For example, in FIG. 6A, the segment builder determines that the leading audio presentation time, e.g., the PTS of the audio frame 621, is less than 960 ms earlier than the PTS of the first I-frame 612. Accordingly, the segment builder calculates the number of additional video frames for completing the first segment and determines the PTS of the last frame 613 in segment[0]. In the example shown FIG. 6A, the segment builder then modifies the PTS of the I-frame 612 based on the PTS of the last frame 613, e.g., setting the PTS of I' 612' to the PTS of the frame 613 minus 86400. In another example shown in FIG. 7, after locating the last frame 730 as the end of the segment, in some embodiments, the segment builder continues iterating according to the order in which the frames are transmitted and includes the video frames 740-760 in the segment. In FIG. 7, the corresponding DTSs of the frames 740-760 have PTS before the PTS of the last video frame 730 along the horizontal axis even though the DTSs of the frames 740 are after the DTS of the last video frame 730 along the vertical axis.

Still referring to FIG. 8, when the leading audio presentation time is not less than 960 ms earlier than the first I-frame ("No"—branch from block 820), as represented by block 840, the segment builder calculates the modified PTS to present the first I-frame 960 ms earlier, e.g., VPTSff[0] =VPTSi−86400. In such cases, as represented by block 842, the segment builder further looks for the first audio frame of VSEG[0] that has a corresponding PTS after the modified PTS value of the first I-frame, e.g., APTS>VPTSff[0] and APTSff[0]=APTS, where APTSff[0] is the PTS of the first audio frame in VSEG[0]. In some embodiments, as represented by block 844, the segment builder determines the last frame PTS of VSEG[0], e.g., VPTSlf[0]=VPTSi. In some embodiments, as represented by block 846, the segment builder includes the I-frame in the first segment and optionally includes B-frames, e.g., B-frames transmitted after the I-frame with their DTS and/or PTS modified.

For example, in FIG. 6B, the segment builder determines that the leading audio presentation time, e.g., the PTS of the start of the audio stream 620B, is more than 960 ms earlier than the PTS of the first I-frame 614. As shown in FIG. 6B, the segment builder calculates the modified PTS to display the first I-frame 960 ms earlier, e.g., the PTS of I' 614' is 86400 earlier than the PTS of the I-frame 614. Further, the segment builder locates the first audio frame 623 that has a corresponding PTS after the PTS of I' 614. In the example shown in FIG. 6B, the segment builder also determines the last frame PTS of VSEG[0], e.g., the PTS of the original I-frame 614. Upon determining the last frame PTS, the segment builder includes I' 614' and P' 616' in segment[0] and optionally includes the plurality of B-frames that are transmitted after the I-frame 614 with their DTS and/or PTS modified.

In some embodiments, the method 800 continues, as represented by block 850, with the segment builder determining the first frame PTS of the next segment, e.g., VPTSff[1] =VPTSlf[0]+3600 (40 ms). As represented by block 852, the segment builder continues to capture audio frames for the first segment, e.g., audio frames within the presentation time range between the first audio frame and the last video frame in the first segment, APTSff[0] <=APTS<VPTSff[1]. As represented by block 854, the segment builder then detects when the PCR time in the stream reaches the end of the first segment and/or the beginning of the next segment, and cuts the audio capture for VSEG[0] if the audio PES is not already complete. For example, in the case of a long audio PES, as described above with reference to FIG. 4, the long audio PES is split and a portion is included in VSEG[0].

Figure 9:
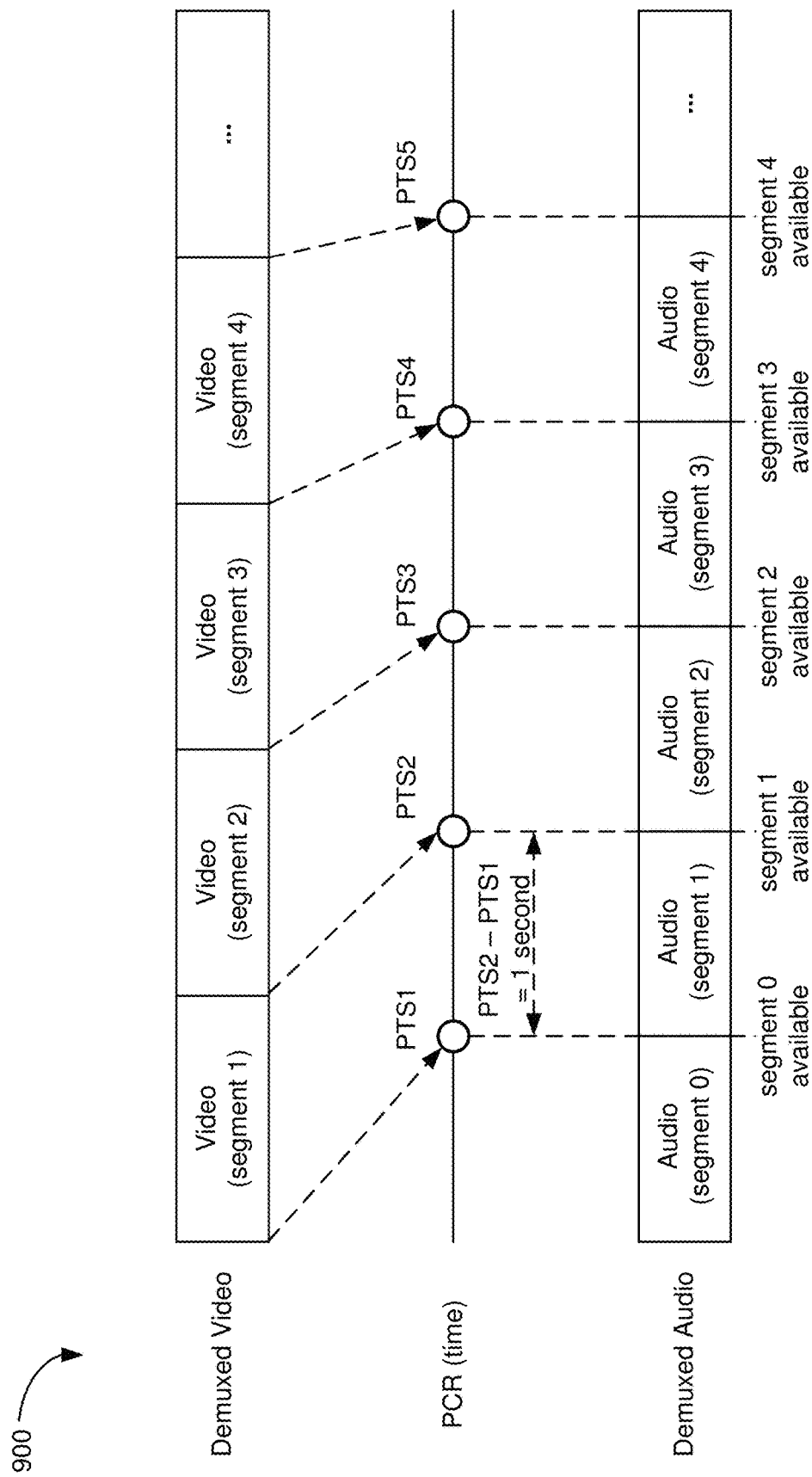
FIG. 9 is a diagram illustrating the availability of segments along an exemplary presentation timeline, in accordance with some embodiments.

FIG. 9 is a diagram 900 illustrating the availability of segments along an exemplary presentation timeline in accordance with some embodiments. As explained above with reference to FIGS. 5A and 5B, in some embodiments, the target duration for each segment along the segmentation timeline is one second, e.g., PTS1 to PTS2 is 1 s, PTS2 to PTS3 is 1 s, PTS3 to PTS4 is 1 s, and PTS4 to PTS5 is 1 s, etc. As shown in FIG. 9, in some embodiments, the demultiplexed audio stream is cut at 1 s intervals and coordinated using the PCR in the stream. Also using the PCR, the demultiplexed video stream is segmented and adjusted so that the audio included within each segment is provided for the same presentation time range as the video. As a result, the video included in each segment has equal video duration, e.g., 1 s. Further, as described above with reference to FIGS. 6A-6B and 7-8, each segment includes complete video frame payloads and fully presentable duration when decoding following on from a previous segment. Additionally, each segment has approximately equal presentation time range for video and audio and thus is published to the playlist one target duration after the previous segment was published. For example, publishing segment 1 to the playlist at PTS1 1 s after publishing segment 0 indicates segment 0 is available, and publishing segment 2 to the playlist at PTS2 is after publishing segment 1 indicates segment 1 is available, etc.

Figure 10:
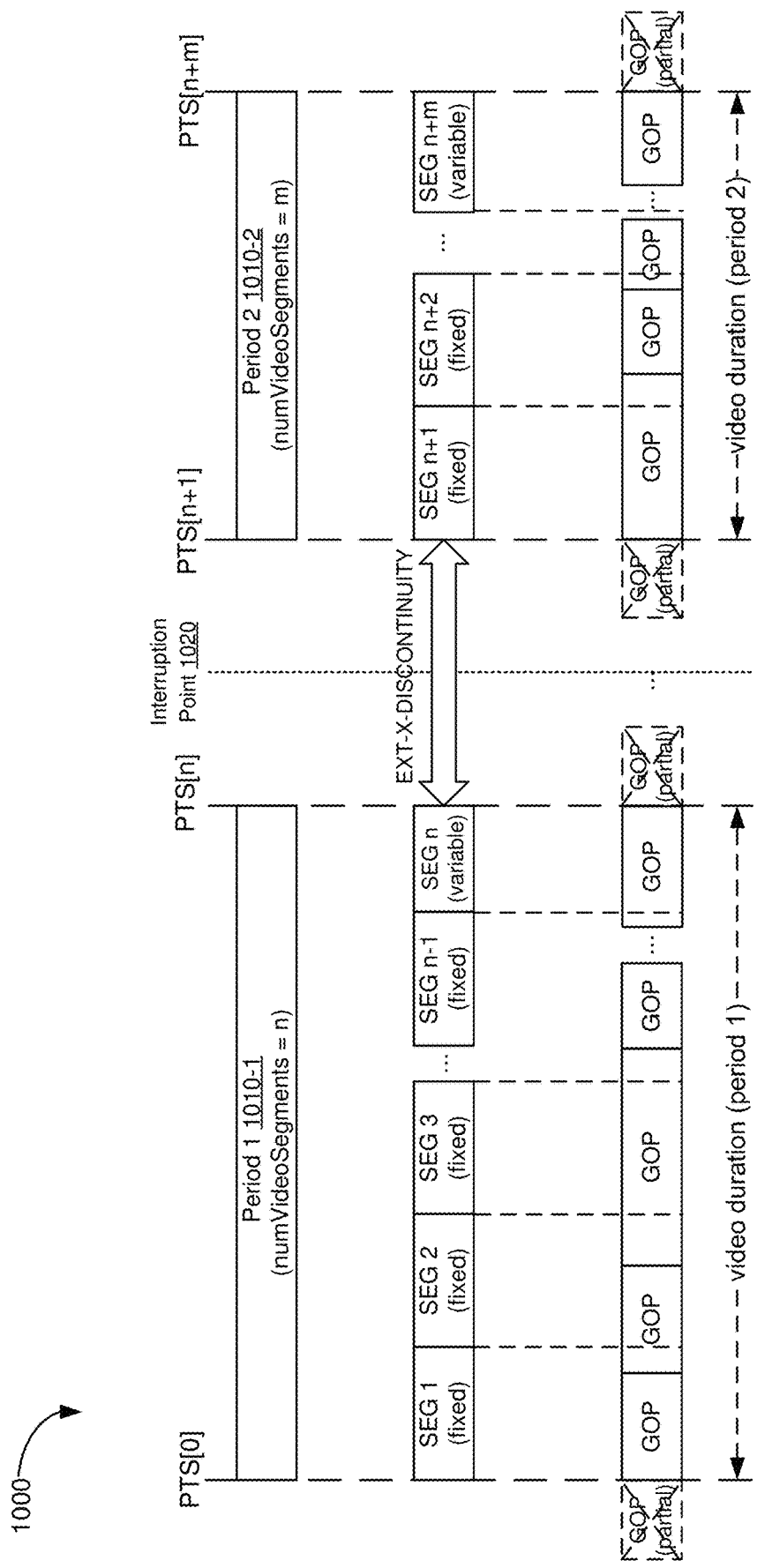
FIG. 10 illustrates an exemplary segmentation timeline for playback of recorded content, in accordance with some embodiments.

FIG. 10 illustrates an exemplary segmentation timeline 1000 for playback of recording, in accordance with some embodiments. A broadcast timing model with open GOPs satisfies a reference decoder model but does not align with HLS. The broadcast streams, in general, are of variable bitrate/constant quality. For example, the GOP structure and transmission time are significant variables in determining the arrival time of video, e.g., the GOP structures as shown in FIG. 10 have variable durations. In contrast, the HLS timing model requires predictable presentation time ranges for positioning and a regular cadence for maintaining the client buffer depth. In some embodiments, periods are used to encapsulate the variables in the broadcast timing model when converting broadcast content to conform with the HLS timing model.

The exemplary segmentation timeline 1000 includes two periods, e.g., period 1 1010-1 and period 2 1010-2. For adaptive streaming, the playlist used to control access to the segmented content includes one or more periods, where a period includes a sequence of segments with certain properties. One property of a period is the linear time within the period without interruption and/or discontinuity, e.g., the sequence of segments 1, 2, 3, . . . , n−1, n in period 1 1010-1 without interruption and/or the sequence of segments n+1, n+2, n+m in period 2 1010-2 without interruption. Another property of a period is the fixed segment duration within the period, e.g., each of the segments 1-n has the same duration. Though not shown in FIG. 10, the last segment may have a different duration from other segments. Yet another property of a period is that the segments in the period are encrypted with the same key, e.g., the same license.

Periods may be classified as open or closed. An open period is growing, such that the sequence is increasing with each segment duration. A closed period is complete, such that the total number of segments in the sequence is known. The flagging and/or classification of a period can change over time and/or change from one portion of the media content to a different portion of the media content. For example, during content recording, for either live/timeshifted viewing or playback, a period is classified as closed when an interruption occurs (e.g., loss of signal lock, smart card removal from the STB, encountering unauthorized content), an encryption key change occurs (e.g., business rule change), and/or the recording ends. In another example, when a new period opens (e.g., after the closing of the previous period due to an interruption), the new period is flagged as being opened with a discontinuity. In yet another example, a completed recording, which experiences business rule changes, can include multiple periods without any discontinuities being flagged. In still another example, at the start of live viewing, an open period is created without discontinuities as soon as the first segment is acquired.

To satisfy the aforementioned properties of periods, in some embodiments, at the start of playback, the segment index controller (e.g., the segment index controller 330, FIG. 3) determines the number of periods for the recording and the number of segments in each period as shown in FIG. 10. The exemplary segmentation timeline 1000 is constructed using the I-frame index generated at the time of recording (e.g., obtained from the push controller 314, FIG. 3). In some embodiments, the segment index controller identifies the first period, e.g., period 1 1010-1, by first identifying the initial I-frame (e.g., locating the I-frame 612' in FIG. 6A or the I-frame 614' in FIG. 6B) and the last I-frame and the time assignment for period 1 1010-1 in the I-frame index. The segment index controller then calculates the period duration based on the PTS value for the first I-frame and the PTS value for the last I-frame for period 1 1010-1, e.g., period duration=(PTSn−PTS0)/90000, where PTS0 is the PTS value for the first I-frame in period 1 1010-1, and PTSn is the PTS value for the last I-frame in period 1 1010-1. The above process is repeated for each period to construct the overall segmentation timeline for the recording.

In some embodiments, as shown in FIG. 10, some interruptions and content durations are not included in the playlist. For example, the partial GOPs that are crossed out in FIG. 10 are not included in the playlist. Instead, in some embodiments, the time indicating the content duration before the start of period 1 1010-1 is signaled using an EXT-X-GAP tag in the playlist for accurate viewing position, where the content duration before the start of period 1 1010-1 is determined using the time values of the interruption and the first frame in period 1 1010-1. Likewise, the time indicating the content duration after the end of period 2 1010-2 can be signaled using an EXT-X-GAP tag, where the content duration after the end of period 2 1010-2 is determined using the time values of the interruption and the last available I-frame in period 2 1010-2. In some embodiments, an EXT-X-DISCONTINUITY tag is used in the playlist to signal the client device of a change, discontinuity, and/or interruption point 1020.

In some embodiments, the segmentation timeline 1000 is used by the video segment builder (e.g., the video segment builder 320, FIG. 3) during playback to construct each segment from the re/de-multiplexed stream, e.g., for determining the first and last frame PTS of each segment. The same segmentation method can be used for live viewing in the steady state, when there is no special first segment to perform I-frame preview as described above with reference to FIGS. 6A-6B and 7-8. For an on-going recording, the segment index controller periodically checks if a new I-frame or timing maker has been added to the recording. In response to detecting a new I-frame or timing marker has been added, the segment index controller recalculates the duration of the current open period using the method described above. The segment index controller further uses the new duration to calculate the number of segments in the current open period in accordance with some embodiments.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a device including a processor and a non-transitory memory:
demultiplexing a broadcast stream to a plurality of streams including a first stream and a second stream;
identifying a first presentation time range of a first segment, wherein the first presentation time range starts before a random access point in the first stream;

identifying a second presentation time range starting after the first presentation time range;
identifying an audio frame in the second stream having an audio presentation timestamp ahead of a video presentation timestamp of the random access point;
identifying one or more video frames subsequent to the random access point in the first stream based on video presentation timestamps, a last frame decoding timestamp of a last video frame in the first presentation time range, and a first frame decoding timestamp of a first video frame in the second presentation time range;
capturing audio frames from the second stream within the first presentation time range; and
packaging the first segment having the first presentation time range, including the random access point, the one or more video frames, the audio frame, and the audio frames.

2. The method of claim 1, wherein:
identifying the audio frame in the second stream that is ahead of the random access point includes determining whether or not the audio frame in the second stream has audio presentation timestamp that is less than a target duration earlier than a first the video presentation timestamp of the random access point; and
identifying the first presentation time range of the first segment includes:
modifying the video presentation timestamp of the random access point to the audio presentation timestamp to align the random access point with the audio frame in accordance with a determination that the random access point is transmitted ahead of the audio frame by less than the target duration; and
in accordance with a determination that the audio frame does not have the time audio presentation timestamp that is less than the target duration earlier than the video presentation timestamp of the random access point, modifying the video presentation timestamp of the random access point the target duration earlier as a start of the first presentation time range, and designating another audio frame in the second stream aligned with the start of the first presentation time range as the audio frame.

3. The method of claim 1, wherein packaging the first segment includes:
re-multiplexing the random access point and the one or more video frames into a single program transport stream; and
appending the audio frame and the audio frames from the second stream within the first presentation time range to the single program transport stream.

4. The method of claim 1, further comprising:
packaging the random access point and the one or more video frames into a first container; and
packaging the audio frame and the audio frames into a second container, different from the first container.

5. The method of claim 1, wherein identifying the one or more video frames subsequent to the random access point in the first stream includes:
identifying a reference frame in the first stream transmitted subsequent to the random access point as part of the one or more video frames; and
maintaining a presentation timestamp of the reference frame in the first segment.

6. The method of claim 1, wherein identifying the one or more video frames subsequent to the random access point in the first stream includes:

identifying a non-reference frame in the first stream transmitted subsequent to the random access point as part of the one or more video frames; and
modifying a presentation timestamp of the non-reference frame to be within the first presentation time range.

7. The method of claim 1, wherein identifying the one or more video frames subsequent to the random access point in the first stream includes:
identifying a frame in the first stream that has a presentation timestamp within the second presentation time range; and
modifying the presentation timestamp of the frame to be within the first presentation time range.

8. The method of claim 1, further comprising:
identifying a plurality of video frames from the first stream based on the video presentation timestamps and decoding timestamps of a last frame of the second presentation time range and a first frame of a third presentation time range;
capturing a plurality of audio frames from the second stream within the second presentation time range; and
packaging a second segment having the second presentation time range, including the plurality of video frames from the first stream and the plurality of audio frames from the second stream, wherein the second presentation time range has a same duration as the first presentation time range.

9. The method of claim 1, wherein capturing the audio frames from the second stream within the first presentation time range includes:
detecting a presentation clock reference (PCR) time reaching an end of the first presentation time range;
determining whether or not a packet in the second stream ends before the end of the first presentation time range; and
splitting the packet at the PCR time in accordance with a determination that the packet does not end before the end of the first presentation time range, wherein the first segment includes a first portion of the split packet, the first portion includes the audio frame and the audio frames.

10. The method of claim 1, further comprising:
determining whether or not the random access point is within a presentation timeline of the first segment specified in a playlist;
generating a portion of the playlist corresponding to the first segment referencing the random access point via byte offsets of the random access point within the first segment in accordance with determining the random access point is within the presentation timeline of the first segment specified in the playlist; and
generating the portion of the playlist corresponding to the first segment referencing a different random access point in accordance with determining the random access point is not within the presentation timeline of the first segment specified in the playlist.

11. The method of claim 1, further comprising:
receiving a request for a particular segment associated with a corresponding segment time period in a recording;
determining whether or not a relevant random access point is associated with the corresponding segment time period;
generating packaging the particular segment to include the relevant random access point in accordance with determining the relevant random access point is associated with the corresponding segment time period; and packaging the particular segment to include a nearby random access point in accordance with determining the relevant random access point is not associated with the corresponding segment time period.

12. The method of claim 1, further comprising:
identifying the random access point and a last random access point in an indexing within a period of a segmentation timeline of a recording, wherein the random access point has the video presentation timestamp and the last random access point has a last video presentation timestamp; and
calculating a duration of the period along the segmentation timeline and a number of segments in the period based on the video presentation timestamp and the last video presentation timestamp.

13. The method of claim 12, further comprising maintaining the segmentation timeline based on the indexing, including:
identifying an interruption in the recording along the segmentation timeline; and
indicating in a playlist associated with the recording the interruption before or after the period.

14. The method of claim 12, further comprising updating the segmentation timeline of the recording, including:
detecting a new timing marker has been added to the recording; and
recalculating the period duration and the number of segments in the period in response to detecting the new timing marker.

15. The method of claim 1, further comprising:
publishing the first segment in a playlist according to a presentation clock reference (PCR) timeline; and
pushing changes to the playlist to a client device.

16. The method of claim 1, further comprising:
causing decoding of the random access point and the audio frame at the same time; and
causing presentation of the random access point while decoding the audio frames.

17. The method of claim 1, wherein the first presentation time range has a fixed duration.

18. The method of claim 1, wherein:
the first stream includes a video stream; and
the second stream includes an audio stream.

19. The method of claim 1, further comprising:
packaging in the first segment one or more of a program association table (PAT), a program mapping table (PMT), and a public key cryptography padding; and
encrypting the first segment for transmission to a local area network.

20. A device comprising:
a processor;
a non-transitory memory; and
one or more programs stored in the non-transitory memory, which, when executed by the processor, cause the device to:
demultiplex a broadcast stream to a plurality of streams including a first stream and a second stream;
identify a first presentation time range of a first segment, wherein the first presentation time range starts before a random access point in the first stream;
identify a second presentation time range starting after the first presentation time range;
identify an audio frame in the second stream having an audio presentation timestamp ahead of a video presentation timestamp of the random access point;
identify one or more video frames subsequent to the random access point in the first stream based on video presentation timestamps, a last frame decoding timestamp of a last video frame in the first presentation time range, and a first frame decoding timestamp of a first video frame in the second presentation time range;
capturing audio frames from the second stream within the first presentation time range; and
package the first segment having the first presentation time range, including the random access point, the one or more video frames, the audio frame, and the audio frames.

* * * * *